C. VISEL.
Vats.

No. 200,586. Patented Feb. 19, 1878.

WITNESSES:
Jas. E. Hutchinson

INVENTOR:
Christian Visel
Elson Bros,
Attys.

UNITED STATES PATENT OFFICE.

CHRISTIAN VISEL, OF COLD WATER, MICHIGAN.

IMPROVEMENT IN VATS.

Specification forming part of Letters Patent No. 200,586, dated February 19, 1878; application filed June 19, 1877.

*To all whom it may concern:*

Be it known that I, CHRISTIAN VISEL, of Cold Water, in the county of Branch and State of Michigan, have invented certain new and useful Improvements in Vats; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1:
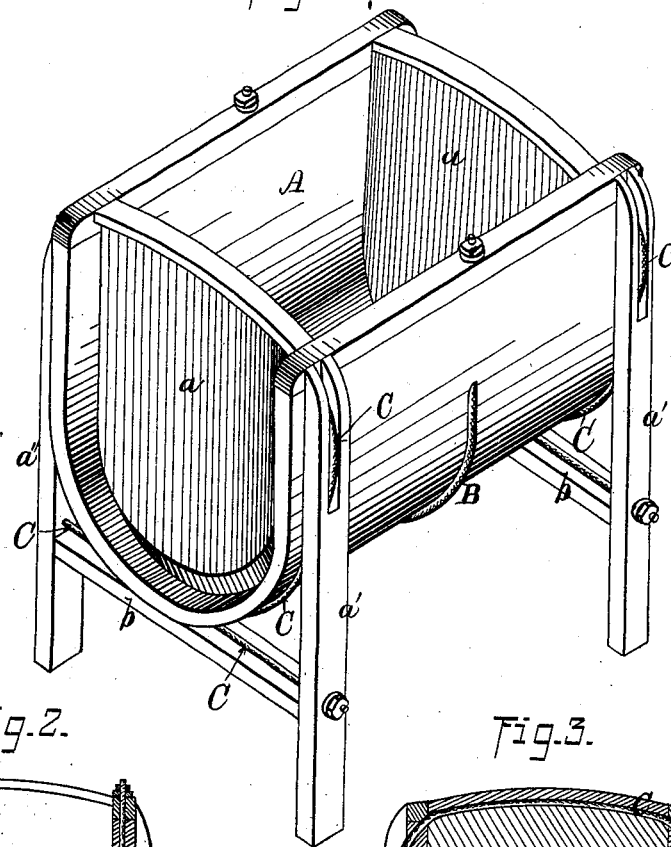
Figure 2:
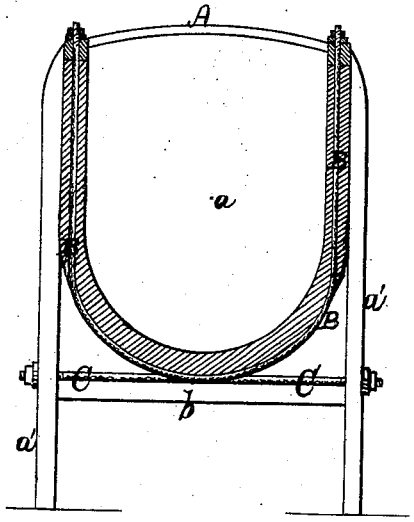

Figure 1 is a perspective view of my improvement in vats or other like receptacles. Fig. 2 is a central transverse section, and Fig. 3 a similar end section, thereof.

Corresponding parts in the several figures are denoted by like letters.

This invention relates to a certain improvement in vats or other like receptacles; the object of which is to obtain the greatest possible amount of strength, to dispense with nails or similar fastenings, and to simplify and expedite the putting together of the parts.

The nature of this invention consists of bows, one embracing or girding the vat externally, about midway of its length, and passing up through the sides thereof and fastened, and two rings embracing the ends of the vat or receptacle, and passing through its supporting standards or legs, and past each other, out through the lower portions of the said legs, fastening the latter and their connecting pieces or braces firmly together, substantially as hereinafter more fully set forth.

In the annexed drawing, A refers to a vat or other receptacle or vessel for holding liquids or solids, the general outline or contour of which may be of a U shape, the form preferably adopted in the present instance to best illustrate my invention, although it may be adapted to vessels of any desired shape.

A bow, B, made of stout wire, embraces or girdles externally the bottom of the vat or receptacle, and passes up through and out of the sides thereof, as particularly seen in Fig. 2, and is then fastened by nuts or otherwise.

Figure 3:
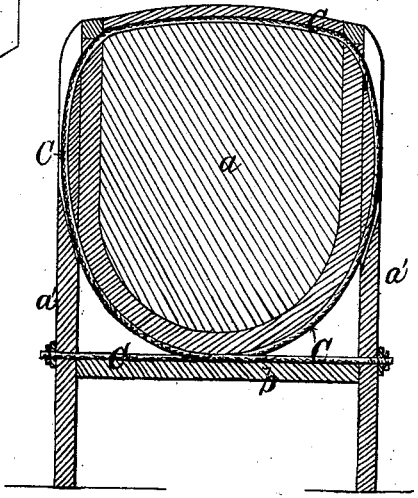

C C are also bows, made of similar wire, which embrace the ends of the vat or receptacle, confining its end-pieces $a\ a$ in place, and pass through supporting standards or legs $a'\ a'$, securing them to the vat, as seen in Figs. 1 and 3, after which their arms are extended past each other and through the lower portions of the said standards or legs $a'\ a'$, and nutted or otherwise secured, fastening the said legs and their connecting pieces or braces $b\ b$ firmly together.

From the foregoing it will be seen that the following results are obtained: The constituent parts or boards of the vat or receptacle can be firmly, expeditiously, and rigidly put together, and firmly braced both in the middle and at its ends, thereby obtaining the greatest possible amount of strength and facilitating its manufacture. Nails or other similar fastenings are dispensed with in its construction. Any shrinkage in the parts can be readily taken up or remedied. It is exceedingly simple and easy of construction, and, consequently, cheap, and its supporting-standards and their braces can be readily connected thereto.

Having thus described my invention, what I claim, and desire to secure by Letters Patent, is—

1. In a vat or other receptacle, the bows C C, embracing its ends and fastening its supporting standards or legs thereto, substantially as and for the purpose set forth.

2. In a vat or other receptacle, the bows C C, embracing its ends and fastening its supporting standards or legs thereto, and the said legs and their connecting pieces or braces together, substantially as and for the purpose set forth.

3. In combination with a vat or other receptacle, the central bow B and end bows C C, substantially as shown and described, and for the purpose set forth.

4. In combination with a vat or other receptacle and its supporting-standards, the bows B and C C, substantially as shown and described, and for the purpose set forth.

5. In combination with a vat or other receptacle and its supporting standards or legs and their connecting pieces or braces, the bows B and C C, substantially as shown and described, and for the purpose set forth.

In testimony that I claim the foregoing as my own I hereunto affix my signature in presence of two witnesses.

CHRISTIAN VISEL.

Witnesses:
GEO. KAPPLER,
DAVID B. PURINTON.